(12) United States Patent
Moreau

(10) Patent No.: US 7,240,024 B2
(45) Date of Patent: Jul. 3, 2007

(54) METHOD FOR REMOTE EXECUTION OF A FUNCTION IN A COMMUNICATION NETWORK

(75) Inventor: Jean-Jacques Moreau, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 513 days.

(21) Appl. No.: 09/971,960

(22) Filed: Oct. 9, 2001

(65) Prior Publication Data

US 2002/0069130 A1   Jun. 6, 2002

(30) Foreign Application Priority Data

Oct. 10, 2000   (FR)   ................... 00 12941
Oct. 10, 2000   (FR)   ................... 00 12942

(51) Int. Cl.
*G06Q 30/00* (2006.01)

(52) U.S. Cl. ...................................... 705/26

(58) Field of Classification Search ................... 705/25, 705/26

See application file for complete search history.

(56) References Cited

U.S. PATENT DOCUMENTS

| | | | | |
|---|---|---|---|---|
| 5,819,092 A | | 10/1998 | Ferguson et al. ........... | 395/701 |
| 5,838,906 A | | 11/1998 | Doyle et al. ........... | 395/200.32 |
| 5,892,900 A | * | 4/1999 | Ginter et al. ................ | 713/200 |

FOREIGN PATENT DOCUMENTS

| | | |
|---|---|---|
| EP | 1 065 592 | 1/2001 |
| ES | 2147503 A1 * | 9/2000 |
| WO | 96 15505 | 5/1996 |
| WO | 99 27475 | 6/1999 |
| WO | 99 56254 | 11/1999 |

OTHER PUBLICATIONS

Carlson/David, Computer-based graphics tools for the graphically challenged, Information Technology and Libraries, Chicago: Dec. 1999. vol. 18, Iss. 4; p. 182, 12 pages.*

Rivest and Shamir, "Payword and MicroMint: Two simple micropayment schemes", MIT Laboratory for Computer Science, May 7, 1996.

* cited by examiner

*Primary Examiner*—James Zurita
(74) *Attorney, Agent, or Firm*—Fitzpatrick, Cella, Harper & Scinto

(57) ABSTRACT

A method of remote execution of a function of a server station from a client station comprises:
 a step of receiving from the server station an interface including a function and an expression for calculating a cost for executing the function;
 a step of evaluating the cost for executing the function by calculating the received expression; and
 a step of sending to the server station a sum of money necessary for executing the function.

Use for remunerating a server station as the functions are executed.

17 Claims, 9 Drawing Sheets

METHOD FOR REMOTE EXECUTION OF A FUNCTION IN A COMMUNICATION NETWORK

BACKGROUND OF THE INVENTION

1. Field of the Invention

The present invention concerns in general terms a method for the remote execution of a function in a communication network.

More precisely it concerns a method for the remote execution of a function on a server station, implemented on a client station.

2. Description of the Related Art

At the present time, more and more computers are working in networks and use the services provided by other computers, referred to as server stations.

It is not rare, in a communication network, for these services supplied by the server stations to be remunerated.

Conventionally, the server station can, in order to be remunerated, open a client account associated with a client station in the network. All the operations performed by the client station on the server station are stored and invoiced regularly, for example every month.

Such a system makes it necessary to open and manage a client account on each server station in the network.

In addition, this type of payment is a constraint on a large communication network, of the Internet type, in which it is desirable for each user, from a client station, to be able to use different servers in the network.

Moreover, it is usual on a communication network for a client station, connected by the network to one or more server stations, to control the remote execution of a function on one of the server stations.

Each function corresponds to a series of instructions in a computer program stored on the server station.

SUMMARY OF THE INVENTION

The purpose of the present invention is to propose a method of remote execution of a function on a communication network, which procures great flexibility for the remuneration of this operation.

According to the invention, a method for remote execution of a function of a server station from a client station comprises:
  a step of receiving from the server station an interface including a function and an expression for calculating a cost for executing the function;
  a step of evaluating the cost for executing the function by calculating the received expression; and
  a step of sending to the server station a sum of money necessary for executing the function.

Thus, for each request for the remote execution of a function transmitted to a server station, a sufficient sum of money is sent for executing this function on the server station.

The functions are thus paid for as they are to be executed on the server station and it is not necessary for the server station to open a client account.

The client station no longer has to manage an account on each of the servers in the network and thus remains free to cease using a server which is no longer suitable for it, or on the contrary to try another server in the network.

The cost is evaluated by calculating the received expression included in an interface.

This is because the execution cost of a function is not known in advance to the client station and must be requested of the server station before the execution of this function.

The server station can thus freely fix the prices, these depending on a commercial policy, the nature of the operation to be performed and the type of data to which this operation applies.

It is thus possible to obtain dynamic invoicing on the communication network, according notably to the type of data to be processed.

In practice, said receiving step receives the function associated with the cost for executing the function, the cost for executing the function being evaluated from the received expression or from the server station.

Alternatively, said receiving step receives the function associated with the cost for executing the function, the cost for executing the function being evaluated from the received expression or fixed.

According to a preferred characteristic of the invention, said sending step sends a remote execution request for the function containing the sum of money.

It is thus possible to transmit the payment relating to the execution of a function directly in the request for execution of this function.

This characteristic avoids the client station generating and sending two different requests, one for the payment for the function, and the other for the execution proper of this function.

According to another preferred characteristic of the invention, said receiving step comprises a step of sending to the server station a request to execute the function, and said receiving step receives from the server station a request indicating that the execution of the function is to be paid and the expression for calculating the cost for executing the function.

Such a system also has guarantees for the server station being correctly remunerated for all the services supplied to the different client stations in the communication network, which is all the more important in wide area networks of the Internet type.

Correlatively, the present invention concerns a client station comprising:
  means for receiving from a server station an interface including a function and an expression for calculating a cost for executing a function;
  means for evaluating the cost for executing the function by calculating the received expression; and
  means for sending to the server station a sum of money necessary for executing the function.

This client station has characteristics and advantages similar to those described above for the method of remote execution of a function.

The present invention also relates to a computer program or a memory medium in which the program is stored, wherein the program comprises:
  a step of receiving from the server station an interface including a function and an expression for calculating a cost for executing the function;
  a step of evaluating the cost for executing the function by calculating the received expression; and
  a step of sending to the server station a sum of money necessary for executing the function.

This computer program or this memory medium have characteristics and advantages similar to those described above.

Other particularities and advantages of the invention will also emerge from the following description.

BRIEF DESCRIPTION OF THE DRAWINGS

In the accompanying drawings, given by way of non-limitative examples.

DETAILED DESCRIPTION OF THE PREFERRED EMBODIMENTS

Figure 1:
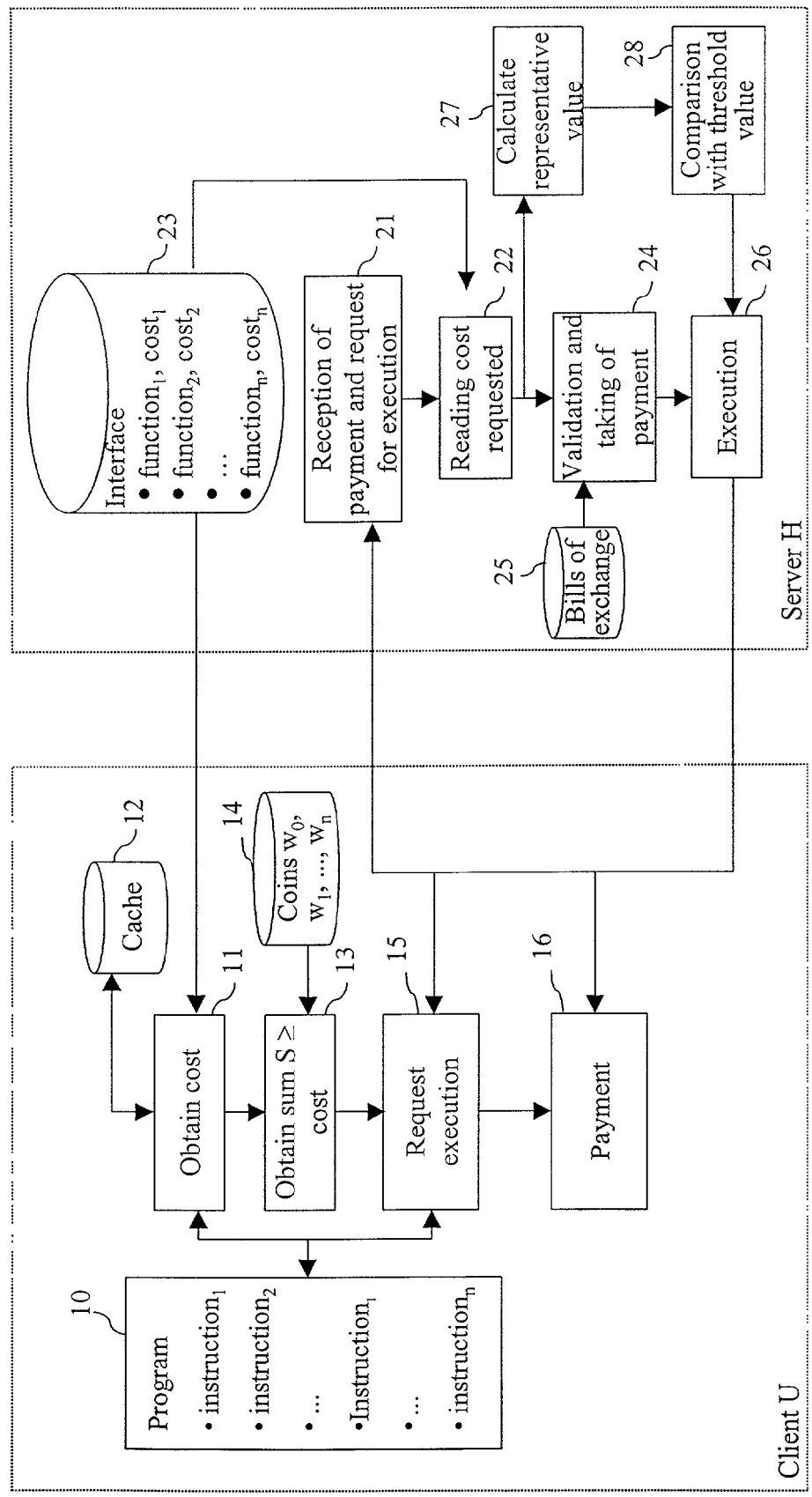
FIG. 1 is a block diagram illustrating a client station and a server station in a communication network adapted to implement the method for the remote execution of a function according to the invention.

A description will be given first of all, with reference to FIG. 1, of a communication network adapted to implement the method for the remote execution of a function according to the invention.

Hereinafter, a client station U connected to a server station H is considered. Naturally, in a communication network, the different computers in the network can in turn be client station U or server station H.

In this example, the client station U can use the services of the server station H. In particular, the client station U can request the execution of a function directly on the server station H.

Each function corresponds to a series of instructions of a computer program.

Naturally the client station U could also request other services of the server station H, for example the supply of a document.

For example, and in no way limitatively, the server station can store digital images, and a user can, through the client station U, perform operations on one of the images on the server station H.

The operations can be the conversion of an image into black and white, the rotation of the image or a symmetry with respect to a horizontal or vertical axis of the image.

When such an operation is executed at a distance, the image will be stored continuously on the server station H and will not pass over the communication network. The client station will merely send a request for remote execution of the operation to the server station.

There will be considered, in the remainder of the description, a distributed object-oriented system. A computer object is an element comprising data, also referred to as attributes, and functions or methods possibly using input arguments. In such a system, the functions can be invoked in order to manipulate the data of the object.

The set of functions applicable to an object and attributes constitute its interface.

In practice, the client station U has means of executing a program 10.

This program contains a series of instructions, one or more of which require the execution of a distant function f on an object o stored on the server station H.

In order to implement this remote execution of an operation, the client station U has means 15 of sending a request to execute a function f.

To implement this remote execution of a function, the client station U has means 11 of obtaining an execution cost associated with the function f.

Here, these means 11 of obtaining a cost make it possible to obtain the interface of the object o and to extract the cost of the function f from this interface.

The client station also has a cache memory 12 in which the costs of execution of one or more functions can be stored.

The client station also has means 13 of obtaining a sum of money S.

These obtaining means 13 cooperate with means of storing coins 14 so as to take a sufficient number of coins, at least equal to the execution cost associated with the function to be executed.

Figure 4:
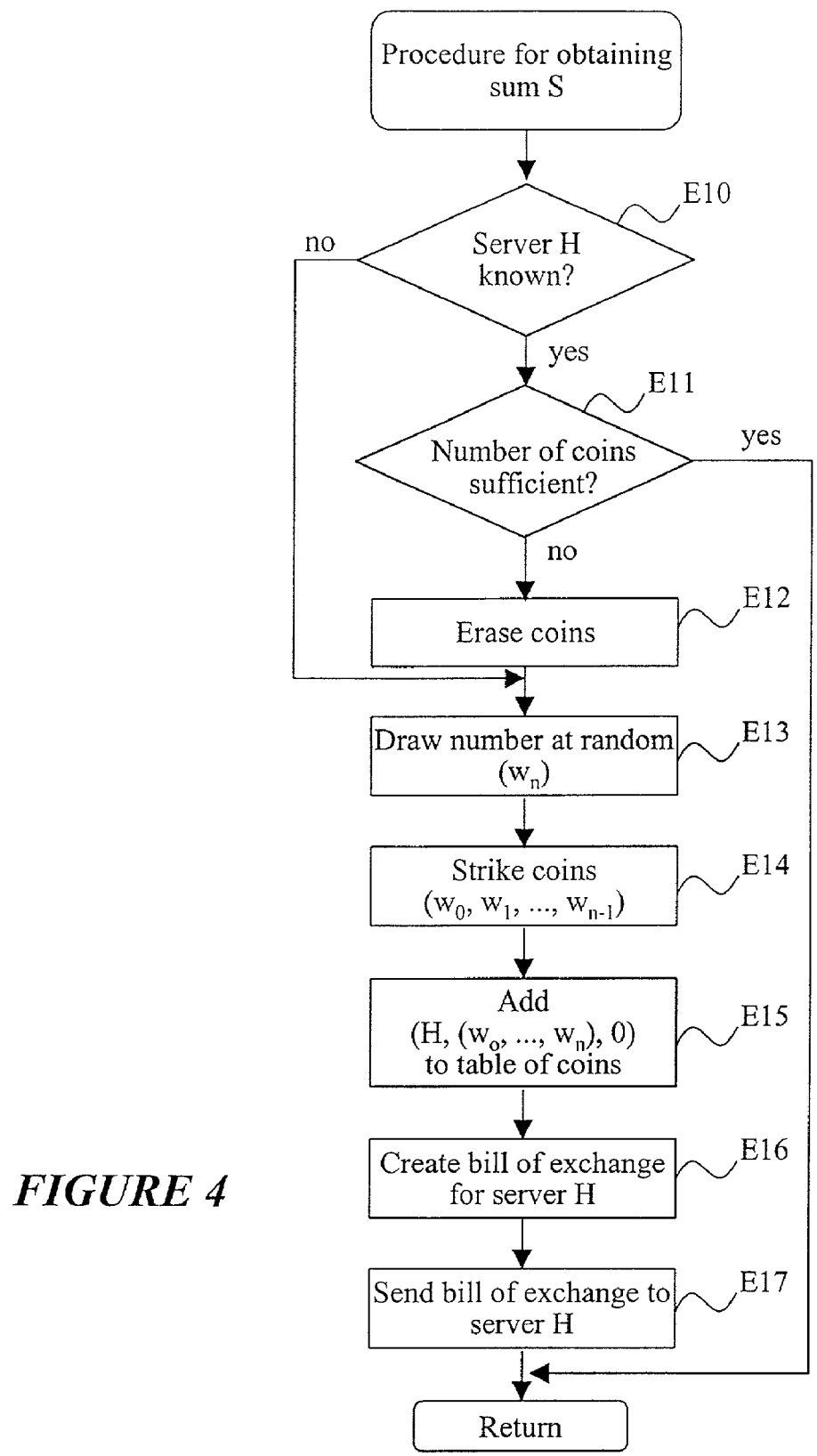
FIG. 4 is an algorithm detailing the method of obtaining a sum of money used in FIG. 3.

The obtaining of a sum of money S and the generation of coins will be explained subsequently, notably with reference to FIG. 4.

Finally, the client station comprises means 15 of sending a request for the remote execution of the function f on an object o and means 16 of sending the payment associated with this function.

Correlatively, the server station H comprises reception means 21 for receiving the payment and the request for remote execution of the function f on the object o.

Means 22 of reading the cost associated with the function f make it possible to obtain the execution cost from the interface stored in an interface memory 23.

In this interface memory 23, the different interfaces of the computer objects of the server station H are stored, including, for each executable function, the associated cost.

The comparison and taking means 24 make it possible to validate the payment received, to compare it with the cost of the function to be executed and to take a sum at least equal to the execution cost associated with the function f.

The validation of the electronic money received can be effected by means of an authenticity certificate (or bill of exchange) stored in a table 25.

Means 26 of executing the function f on the object o are also incorporated in the server station H.

The server station H also comprises means 27 of calculating a value representing the activity of a client station on the server station H.

Comparison means 28 also make it possible to compare this value representing an activity with a predetermined threshold value.

The functioning of these calculation means 27 and comparison means 28, making it possible to manage an initial phase during which the server station H supplies services free of charge to a client station U, will be explained subsequently with reference to FIGS. 7A and 7B.

Figure 2:
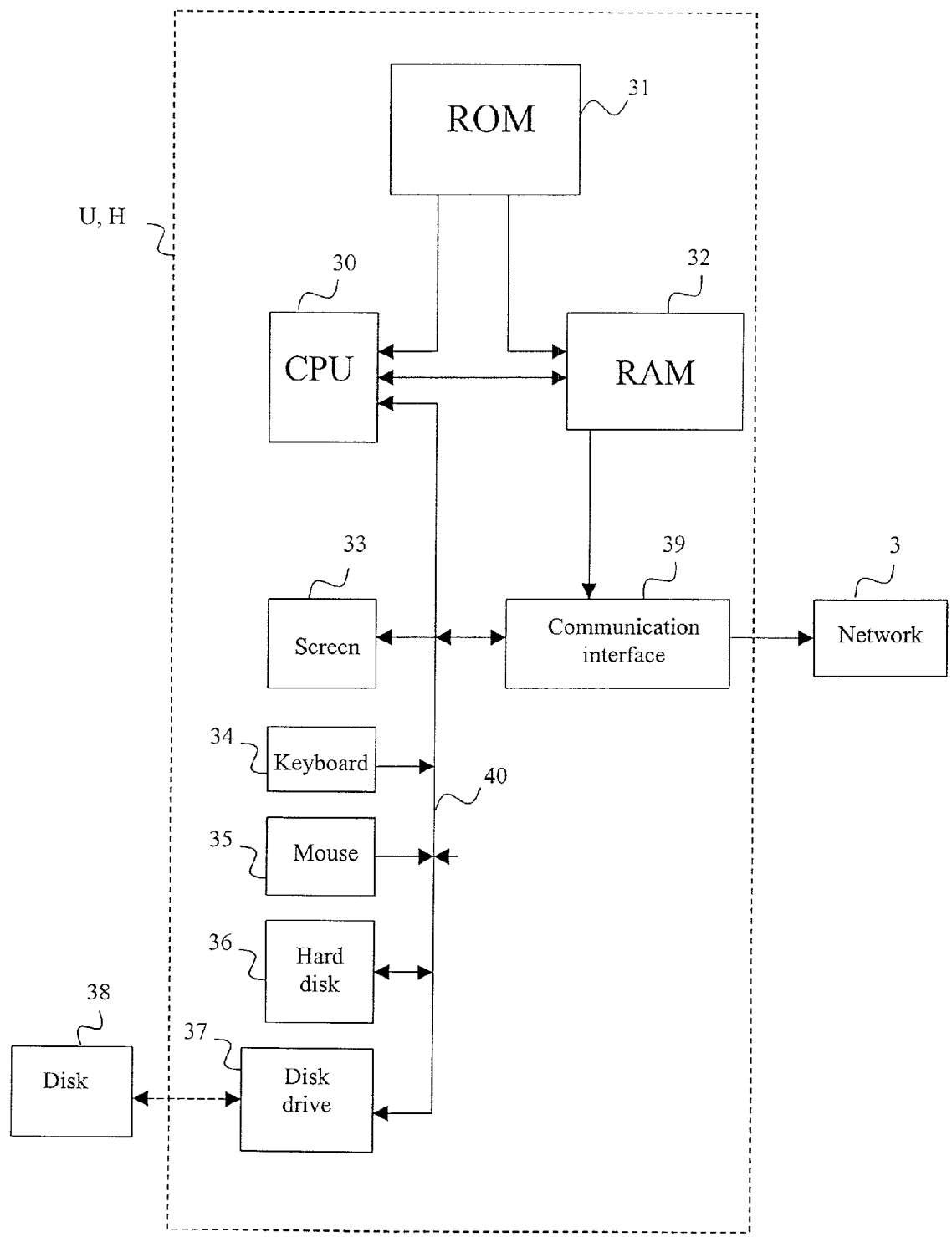
FIG. 2 is a block diagram illustrating a computer adapted to implement the invention.

All these means 10-16 and 21-28 can be incorporated both at the level of the client station U and at the level of the server station H in a computer as depicted in FIG. 2.

This computer comprises, in a conventional manner, a microprocessor 30, a read only memory 31 (ROM) and a random access memory 32 (RAM) containing different registers for implementing the method according to the invention.

The computer has notably a communication interface 39 which can be connected to a communication network 3 in order to receive or transfer requests for information.

In addition, the computer has document storage means, such as a hard disk 36, or is adapted to cooperate, by means of a disk drive 37, with removable storage means 38 such as diskettes, compact discs or computer cards (PC Cards).

These fixed or removable storage means can contain the code for the remote operation execution method according to the invention which, once read by the microprocessor 30, will be stored on the hard disk 36.

By way of variant, the program enabling the device to implement the invention can be stored in the read only memory 31.

As a second variant, the program can be received and stored as described previously by means of the communication network 3.

In a conventional manner, the computer also has a screen 33 for serving, for example, as an interface with an operator by means of a keyboard 34 or a mouse 35 or any other means.

The central unit 30 or microprocessor (CPU) will execute instructions relating to the implementation of the invention.

On powering up, the programs and methods relating to the invention, stored in a non-volatile memory, for example the read only memory 31, are transferred into the random access memory 32, which will then contain the executable code of the invention as well as the variables necessary for implementing the invention.

Thus the random access memory 32 incorporated in a client station of a communication network will comprise registers for storing notably the cache memory 12 and the table of coins 14.

Likewise, the random access memory 32 incorporated in a server station of a communication network will comprise registers for storing the value representing an activity of a client station, the different interfaces, an electronic purse for storing the payment taken and a bill of exchange table for storing bills of exchange for validating the sum of money received.

A communication bus 40 affords communication between the different sub-elements of the computer or linked to it.

The representation of the bus is not limitative and notably the microprocessor is able to communicate instructions to any sub-element directly or by means of another sub-element.

Figure 3:
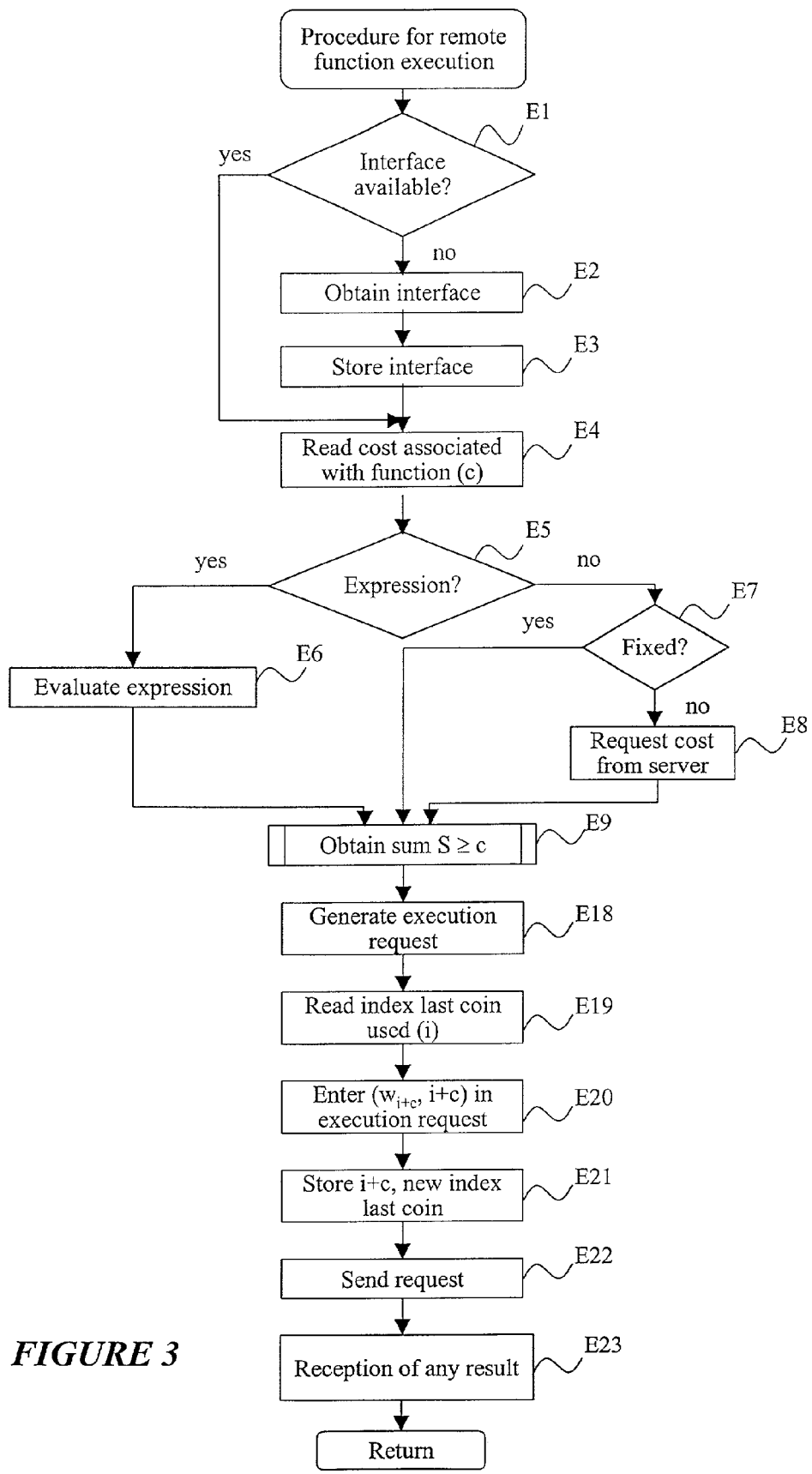
FIG. 3 is an algorithm illustrating the method for the remote execution of a function according to a first embodiment of the invention.

A description will now be given, with reference to FIGS. 3 and 4, of the method for the remote execution of an operation as implemented from a client station in a communication network.

It is wished to execute, by way of example, a remote function associated with an object o of the server station H.

Since each computer object o is created in a programming language used for the computer application peculiar to the computer which stores the object, it is necessary to use a communication language common to the communication network in order to share the computer objects.

On the Internet it is possible to use a communication language such as XML ("eXtended Markup Language").

The use of this communication language for representing computer objects on the network and accessing their functions is described in detail in the European patent application 0 401 754.7 filed by Canon Research Centre France S.A.

A description is given below of the different data fields which it is necessary to translate into the communication language of the network in order to invoke at a distance functions on objects o.

Field: interfaces

This field makes it possible to send several interfaces to distant applications.

```
<interfaces>
    <interface>...</interface>
    ...
    <interfaces>
```

Field: interface

This field corresponds to the generic concept of an object class, as defined in the JAVA or C++ languages.

An interface describes the operations or functions which are supported by a computer object o.

These functions generally use input arguments and possibly supply a result.

An interface also describes the attributes or data field which all the objects supporting this interface contain when they are translated into the communication language.

An interface can also contain a reference to other interfaces, whether they extend to these other interfaces or supply only a shorthand for using these other interfaces. The object then supports all these other referenced interfaces.

Field: attribute

This field includes a list of the attributes which an object supporting the interface contains when it is translated into the communication language.

Field: functions

This field contains a list of the functions or operations associated with the computer object supporting this interface.

```
<functions>
        <function> ... </function>
        ...
    <functions>
```

Field: function

This field corresponds to the generic concept of function. A function is identified by its signature, for example a name, the type of input argument used and the type of object obtained when this function is executed.

Field: arguments

This field contains a list of the input arguments which a function requires for its implementation.

```
<arguments>
        <arg> ... </arg>
        ...
    </arguments>
```

Field: argument

This field corresponds to an input argument of a function and can for example be a literal object or a complex object.

The function field thus makes it possible to invoke a function on a distant object. It is necessary to specify the target object o and the input arguments of the function as described above.

Thus, in order to execute a distant function f, the method of controlling this function on the client station U includes first of all a test E1 for checking whether the interface associated with the object o is available on the client station U.

In practice, it is checked whether a corresponding interface has already been stored in the cache memory 12 of the client station U.

In the negative, a step E2 is implemented in order to obtain this interface from the server station H.

The request for obtaining an interface comprises the computer address of the interface.

When the server station H receives the request for obtaining an interface, the server station extracts the computer address referencing the requested interface from this request.

The server station can, from a table, find the requested interface and transmit it to the client station U, possibly after translation of this interface into the communication language of the communication network.

As described previously, this interface comprises one or more functions associated with the code for executing these functions.

According to the invention, each function is also associated with a cost of execution of this function.

An example is given below of an interface for manipulating an image at a distance.

This interface has three functions:

"ConvertToB&W", whose price is constant. This function makes it possible to convert an image into black and white;

"Rotate", whose price depends on the size of the image and the angle of rotation. The price is expressed in the form of an expression which the client station can evaluate: this function makes it possible to change the orientation of an image.

"Flip", whose price depends on parameters determined by the server station. The client is not capable of making the price calculation himself. The price is for example available at the following computer address:

http://oceania/web-obj/class/Image.xml#flip#price

This function makes it possible to apply symmetry to the image.

```
<interface
    name="Image"
    href=http://oceania/web-obj/class/Image.xml/>
    <attributes>
        <int name="width"price="0.01 FF"/>
        <int name="height"price="0.01 FF"/>
        <string name="encoding"/>
    </attributes>
    <functions>
        <function name="convertToB&W"price="0.5 FF">
        </function>
        <function name="rotate">
            <arguments>
                <int name="angle"/>
            </arguments>
            <price>
                <currency name="FF"/>
                <value language="JavaScript">
                    function price (width, height, angle) {
                        return width*height*angle;
                    }
                </value>
            </price>
        </function>
        <function name="flip">
            <price>
                <currency name="FF"/>
```

-continued

```
                <value/>
            </price>
        </function>
    </functions>
</interface>
```

After reception of the interface, a storage step E3 stores the interface for subsequent use in the cache memory 12 of the client station.

A reading step E4 reads in the interface received the cost c associated with the function f which it is wished to execute.

In a test step E5 it is checked whether the cost is an expression to be calculated.

In the affirmative, an evaluation step E6 makes it possible to evaluate the cost of the function to be executed from the expression received.

Such is the case for example for the rotation function "rotate".

Otherwise it is checked in a test step E7 whether the cost of the function is fixed. Such is the case for example for the transformation of an image in black and white.

Otherwise an obtaining step E8 is implemented in order to request the cost of the function from the server station. Such is the case for the symmetry function "flip".

When the cost c associated with the function f which it is wished to execute at a distance is known, a procedure E9 is implemented for obtaining a sum of money S at least greater than the cost of the function to be executed.

This procedure for obtaining a sum of money S will be described in detail with reference to FIG. 4.

In order to obtain a sum of money S, it is necessary to generate electronic money on the client station U for creating a series of coins which can then be spent on the communication network.

By way of example, in order to generate this electronic money, use is made of a system known as PayWord proposed by Rivest and Shamir.

A description of this system can be consulted at the Internet address http://theory.lcs.mit.edu/~rivest/Rivest-Shamir-mpay.ps.

This system consists in general terms, using a random number $W_n$, of generating a series of numbers by means of a hash function.

This PayWord system has the advantage of being reliable and not requiring the approval of a third party organisation (a bank, notary etc) for validating each individual payment.

In practice, in a test step E10, it is checked whether the server station H is known to the client station U. If not, the client station draws a number at random in a random drawing step E13. Let the random number be $W_n$.

Next, in a coining step E14, a known hash function is applied recursively such that:

$$W_{n-1} = h(W_n)$$

This hash function h has the particularity of not being reversible so that it is impossible, from a number $W_{n-1}$ to find the previous number $W_n$.

Thus a series of coins $W_n$, $W_{n-1}$, ... $W_2$, $W_1$, $W_0$ is obtained.

The end $W_0$ of the chain of numbers thus obtained is called the root coin and makes it possible to verify the authenticity of the different coins.

This PayWord system advantageously makes it possible to verify the authenticity of the coins simply by applying the hash function.

When such electronic money is generated, it is necessary for the client station U to obtain a certificate from a bank in order to prove its identity to the subsequent vendors.

Two certificates are used:
- a bank certificate $C(Pk_e)$, issued by a bank in response to a request from a client station; and
- a bill of exchange $C(W_o)$ generated directly by the client station.

The bank certificate $C(PK_e)$ is an assurance for each vendor that the bank will honour any request for redemption of authentic coins. The bill of exchange $C(W_o)$ is an assurance for each vendor that the coins produced by the client station are indeed authentic and will be honoured by the bank.

In practice, the client station sends to a banking organisation the number of its credit card as well as its public key $Pk_e$.

The banking organisation returns a bank certificate $C(PK_e)$, which contains the identity of the banking organisation, the identity of the client station and the public key of the client station $PK_e$. This certificate also has an electronic signature authenticating the information which it contains, this signature being produced by the bank by means of its private key $SK_b$.

Once the different coins $W_0, W_1, \ldots, W_n$ have been generated, these coins are stored in a storage step E15 in the table of coins 14 as illustrated in FIG. 1 in association with an identifier of the server H and an index i, initialised to the value 0, corresponding to the index of the last coin used in the table of coins 14.

In addition, from the bank certificate $C(PK_e)$ obtained from the bank, the client station U generates, in a bill of exchange creation step E16, a certificate or bill of exchange intended for the server station H.

Each bill of exchange contains the bank certificate $C(PK_e)$ previously received, the identity of the server H for which it is intended, and the root coin $W_o$. This bill of exchange also includes an electronic signature authenticating the information which it contains, this signature being produced by the client station by means of its private key $SK_e$.

After this step E16 of creating a bill of exchange, the latter is sent in a sending step E17 to the server station H.

The bills of exchange and the coins are specific to a given server.

Finally, the server station H receives, by means of the certificate $C(PK_e)$, the following information: the identity of the banking organisation and of the client station, the public key of the client station $PK_e$, and the root coin $W_o$.

It should be stated that the public key of the client station $PK_e$ is contained in the bank certificate $C(PK_e)$. The authenticity of this key can therefore be established by comparing the value obtained by decoding the signature of this certificate by means of the public key of the bank $PK_b$, with the initial information contained in this certificate (excluding the signature).

Moreover, it should be stated that the coin $W_o$ is contained in the bill of exchange of the client station $C(W_o)$. The authenticity of this coin can therefore be established by comparing the value obtained by decoding the signature of the certificate by means of the public key $PK_e$ previously authenticated, with the initial information contained in this certificate (excluding the signature).

Thus, by means of a double signature, each server is capable of verifying that it is indeed in possession of a root coin $W_o$ issued by a client, known to the bank, and authorised by the latter to issue electronic money coins.

If at the end of the test step E10 the server H is already known, it is checked in a test step E11 whether the table of coins 14 contains sufficient coins usable on this server station H for executing a function at a distance.

If not, an elimination step E12 erases the remaining coins in the table of coins 14 and the steps described previously E13 to E17 are implemented in order to generate new coins which can be used on the server station H.

Thus the table of coins 14 is filled automatically as soon as it no longer contains sufficient electronic money.

The number of coins n generated by the client station U can depend possibly on the frequency of use of the server station H.

This number of coins can also be constant and determined once and for all.

It should be noted that it is preferable to generate a large number of coins during the coining step E14 and to store these in the table of coins 14 for subsequent use, that is to say when it is wished to execute at a distance, from the client station U, several functions on the same computer object o.

Returning to FIG. 3, the client station U next generates in a step E18 a request to execute at a distance the function f on a computer object o.

Here, and in no way limitatively, the sum of money necessary for executing the function is entered directly in the request for remote execution of the predetermined operation.

For this purpose, a reading step E19 reads in the table of coins 14 the index of the last coin used.

For a cost c of the function f, and assuming that each coin $W_i$ corresponds to a unit fraction of the cost c, c coins are taken from the table of coins 14.

In practice, the value ($W_{i+c}$, i+c) is entered in the remote execution request.

After this entry step E20, a storage step E21 stores the new index i+c corresponding to the last coin used in the table of coins 14 for the server H.

Thus the remote execution request transmitted by the client station U during the sending step E22 contains the sum of money necessary for executing the function requested on the server station H.

If necessary, a reception step E23 makes it possible to receive the result of the execution of the function f of the object o.

The function can thus be executed and paid for as required.

In the example given here, of the manipulation of a digital image, the user of the client station U is not obliged to purchase image processing software in advance. On the contrary, the user will paid only for the functions actually used for manipulating an image.

By virtue of the micropayment system described above, the coins occupy only a small amount of memory space in the request for remote execution of a function.

The coins generated each have a length for example of 32 bytes. The index of the coin in the series of coins generated can be coded in 16 bits, which makes it possible to generate $2^{16}$ coins.

Moreover, the execution cost is not known in advance to the client station and it can be fixed freely by the server station, notably according to the object or data to which the function is applied.

Thus certain relatively rapid functions which are easy to execute (for example the conversion into black and white of an image of 16 pixels per side) will be less expensive than an appreciably longer and more complex operation (for example the rotation through 35° of an image of 2048 pixels per side). The conversion into black and white will for example be invoiced at 1 centime by the server station H, whilst the rotation will be invoiced at 1 franc.

A description will now be given, with reference to FIGS. 5 and 6, of the method of executing a function on the server station, this function having been actuated at a distance by the client station U.

Before performing any paid function on the server station H, it is necessary for the server station H to previously store the bill of exchange received by the server H at the end of the sending step E17.

Figure 5:
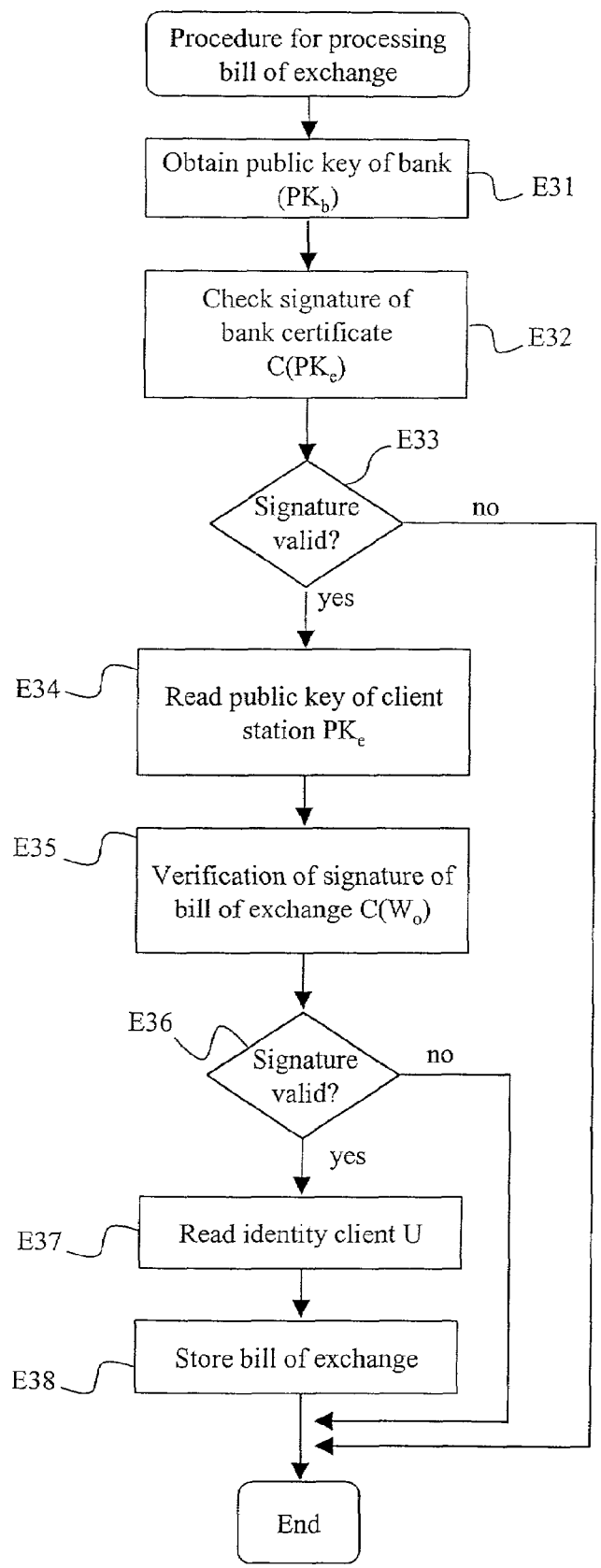
FIGS. 5 and 6 are algorithms illustrating the method of executing a function on a server station according to a first embodiment.
Figure 6:
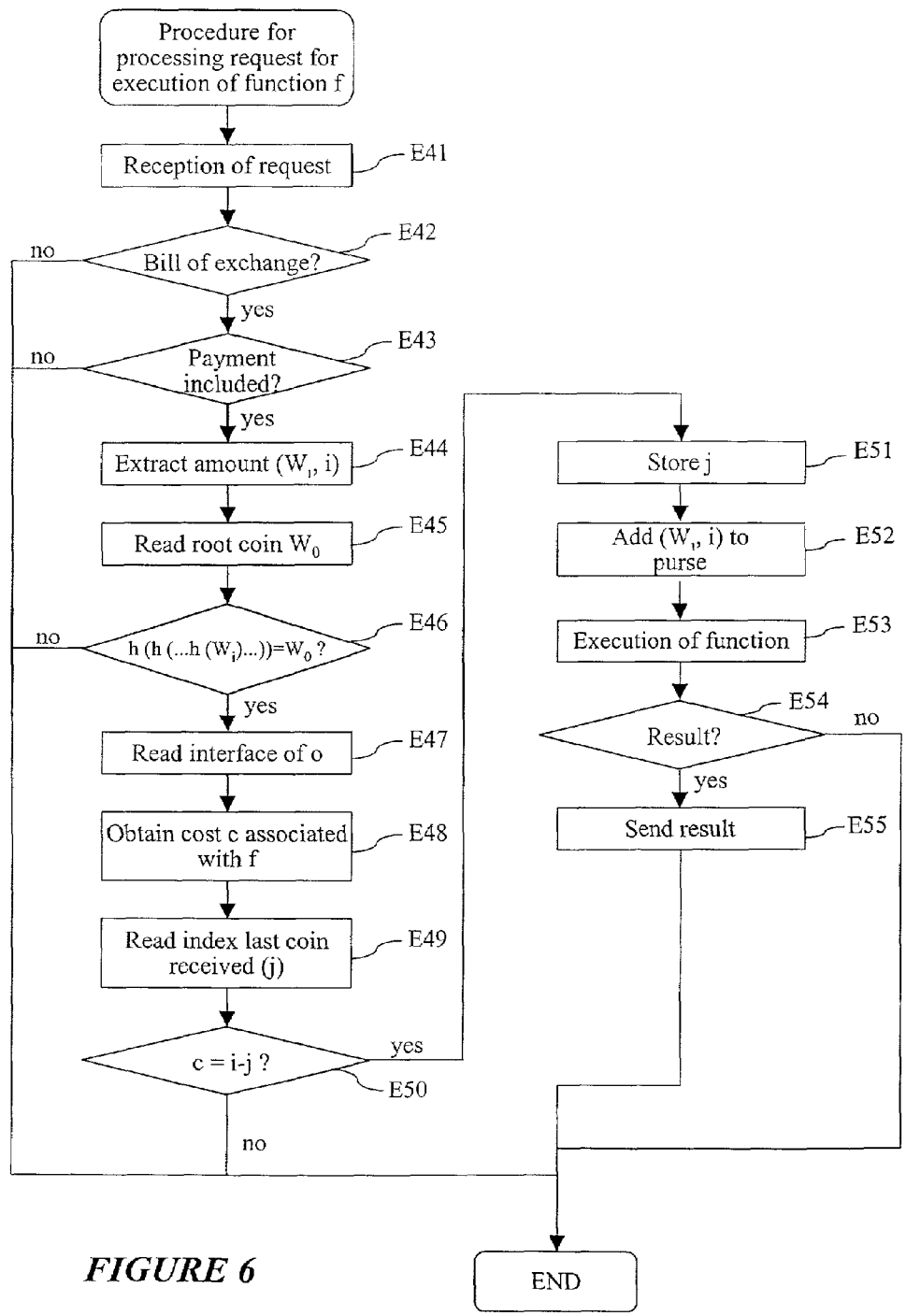

This procedure for processing a bill of exchange is illustrated in FIG. 5.

An obtaining step E31 enables the server station H to obtain, from a certification body, the public key of the bank $PK_b$ corresponding to the signature procedure used by the bank.

As described previously, a step E32 of checking the bank certificate $C(PK_e)$ can be implemented using the bank public key $PK_b$ in order to verify the signature.

At the end of a test step E33, if this signature is not valid, the procedure is interrupted.

Otherwise a reading step E34 is implemented in order to read the public key of the client station $PK_e$. This public key $PK_e$ checks, in a step E35, the signature of the bill of exchange $C(W_o)$ received by the router.

At the end of a test step E36, if this signature is not valid, the procedure is interrupted.

Otherwise a reading step E37 is implemented in order to read the identity of the client station U.

A storage step E38 then stores the bill of exchange in the bill of exchange table 25 of the server station H.

In practice, each identifier of the client station U is stored in association with the certificate of authenticity or bill of exchange $C(W_0)$, and more precisely with the value of the root coin $W_0$.

A description will now be given, with reference to FIG. 6, of the procedure for executing a function on the server station H, this function being controlled by the client station U.

A reception step E41 receives the remote execution request sent by the client station U.

A test step E42 checks whether there exists a bill of exchange in the bill of exchange table 25 of the server station H corresponding to the client station U. In the negative, the request for remote execution of a function is rejected and the transmission over the network is interrupted.

Otherwise a test step E43 checks that the request does indeed include, in a specific field, a sum of money S corresponding to the payment for the function to be executed.

In the negative, the procedure for processing the remote execution request is also interrupted.

Otherwise an extraction step E44 is implemented in order to read the stored sum corresponding here to a coin $W_i$, and its index i in the chain of coins generated at the client station U.

From the reading of the bill of exchange in the table 25, it is possible to obtain the value of the root coin $W_0$ in a reading step E45.

A validation step E46 then checks the authenticity of the coin $W_i$.

In practice, the hash function h is applied recursively to this current coin $W_i$, and here i times:

h (h( . . . h($W_i$)))

The value thus obtained is compared with the value of the root coin $W_o$.

It is also possible, in order to accelerate this validation step E46, to apply the hash function h recursively i–j times, that is to say a number of times just sufficient to find a coin $W_j$, of index j less than the current index i, and already taken by the server for paying for the execution of a function.

If the value obtained is different, the procedure for processing the function execution request is interrupted.

The server station H thus maintains a high throughput, close to that of the same system without payment.

This is because the verification of the payment by the server station H is a simple operation, consisting of applying a hash function. In particular, it is necessary neither to have recourse to a banking organisation for verification, nor to implement expensive cryptographic methods. This is important in a system which may, in certain cases, have to perform several thousands of operations at a distance per second.

After validation of the coins received, a reading step E47 is implemented in order to obtain the interface of the object o to be manipulated.

From the reading of this interface stored on the server station H, the cost c associated with the execution of this function f applied to the object o is obtained.

This obtaining step E48 is implemented as described above with reference to FIG. 3. In practice, either the execution cost c is fixed and read directly in the interface, or the execution cost is the result of an expression to be calculated.

Next a reading step E49 reads the index j of the last coin received, and a test step E50 checks whether the number of coins received is sufficient to pay for the cost c of the function to be executed.

In practice, the following equality is checked at the test step E50:

$$c=i-j$$

where c is the cost associated with the function f,
i is the index of the current coin, and
j is the index of the last coin received by the server station H.

Naturally, it would be possible merely to verify that the cost c is less than or equal to i–j.

If the payment included in the request for remote execution of a function is not sufficient, the procedure for processing this request is interrupted.

Otherwise a storage step E51 stores the new index i as the index j of the last coin received.

An addition step E52 then stores the taken coin $W_i$ associated with its index i in an electronic purse of the server station H.

Next, in a conventional manner, an execution step E53 executes the requested function on the object o.

A test step E54 checks whether there is a result at the end of execution of this function.

In the affirmative, a sending step E55 is adapted to return the result to the client station U.

By virtue of the invention, since the functions are paid for as they are executed, it is not necessary for the server station to open an account for each client station U.

Periodically, each server station H can retransmit to the banking organisation the values $W_i$ associated with each index i, stored in the electronic purse, in order to recover the monetary value.

It is thus possible to execute at a distance functions remunerated on different objects of a communication network, without delaying their execution.

A description will now be given with reference to FIGS. 7A and 7B of two other embodiments of the operation execution method as implemented on the server station H of the communication network.

In these embodiments, a method of executing operations on a server station procures an initial phase of use adapted to each client station.

The method of executing an operation includes first of all a step E61 of receiving a request for execution of an operation sent by the client station U.

An obtaining step E62 is implemented in order to obtain the identity of the client station U, generally incorporated in the execution request.

Here, a value representing an activity V of this client station U on the server station H is then updated.

Figure 7A:
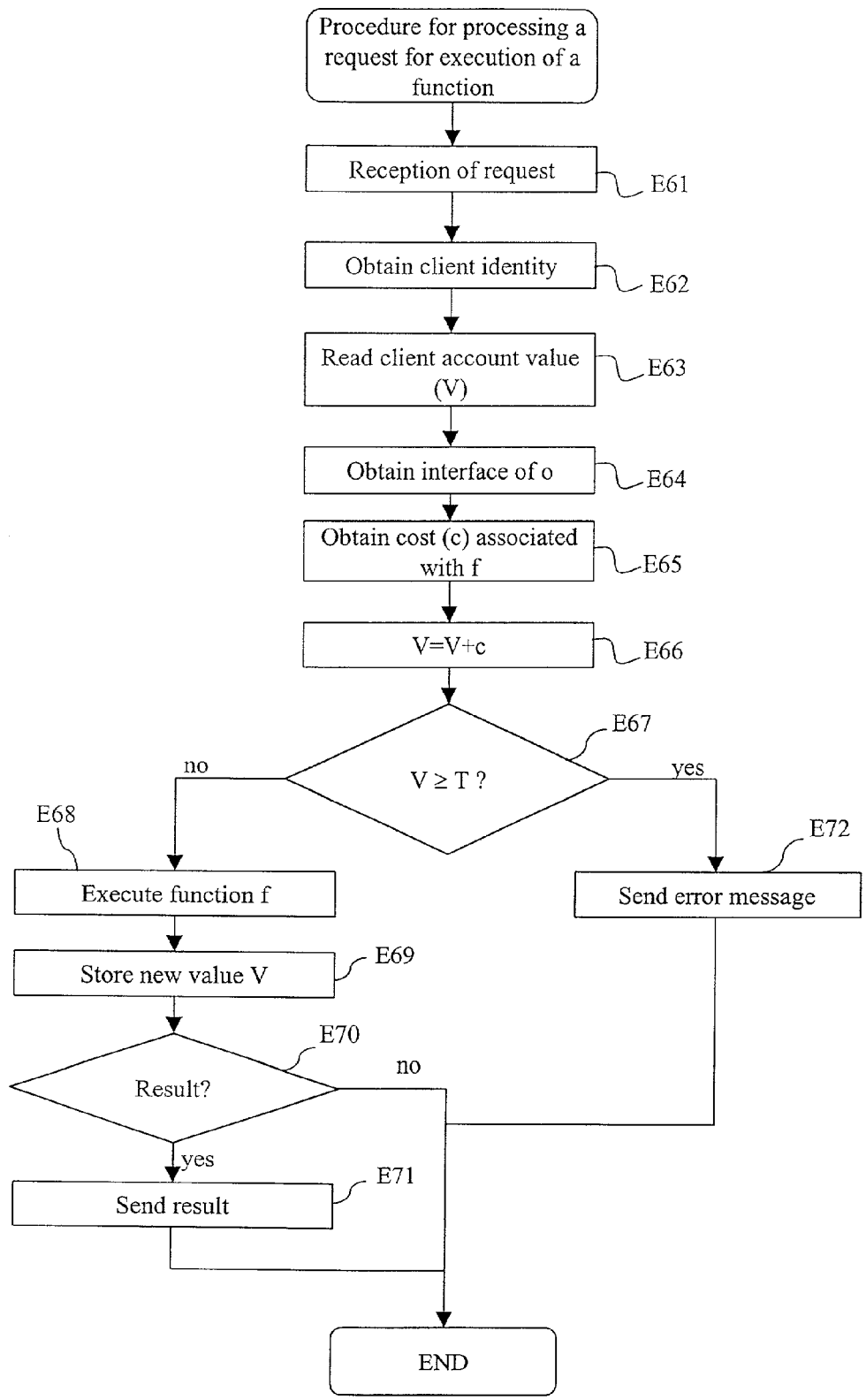
FIG. 7A is an algorithm illustrating the operation execution method according to a second embodiment.

In the embodiment illustrated on FIG. 7A, this value representing an activity V corresponds to the sum of the execution costs c associated respectively with each operation executed on the server station in response to requests sent by the client station U.

Thus all the execution costs associated with the operations executed at the request of the client station U on the server station H are totalled.

For this purpose, at the step of updating the value representing an activity V, the execution cost c associated with the current operation to be executed is added to this value.

In practice, a reading step E63 makes it possible to know the value representing the activity V stored on an account associated with the client station U.

In the object-oriented system described here, an obtaining step E64 is implemented to obtain the interface associated with the computer object o on which the required function f is to be executed.

An obtaining step E65 makes it possible, from the reading of this interface, to obtain the execution cost c associated with the function f.

The updating proper of the value representing the activity V of the client station is performed in an addition step E66 in which:

$$V=V+c$$

A comparison step E67 compares the value representing the activity V with a predetermined threshold value T.

Here, this predetermined threshold value corresponds to a monetary sum T predetermined by the server station. This monetary sum T can correspond to a lump sum paid in advance by the client station. In this type of functioning, the operations performed by the server station must be invoiced only when the lump sum is exhausted.

The monetary sum T can also correspond to an offer for the free trial of the services provided by the server station.

If the value representing the activity V does not reach this predetermined threshold value T, that is to say if the value representing the activity V is strictly less than the predetermined threshold value T, an execution step 68 is implemented on the server station in order to execute the function f.

A storage step E69 stores the value representing an activity V updated for a subsequent use in the account associated with the client station U.

In a conventional manner, after the execution of the function f, a test step E70 checks whether a result has been supplied at the end of the execution of this function.

In the affirmative, a sending step E71 transmits this result to the client station U.

If at the end of the comparison step E67 the value representing an activity V reaches the predetermined threshold value T, that is to say this value representing an activity V is here greater than or equal to the predetermined threshold value T, a sending step E72 sends to the client station U a request indicating that the function f cannot be implemented free of charge and must be invoiced to the client station.

In practice, in the example embodiment described here, during this sending step E72, the request includes the execution cost c of this function to be executed.

Figure 7B:
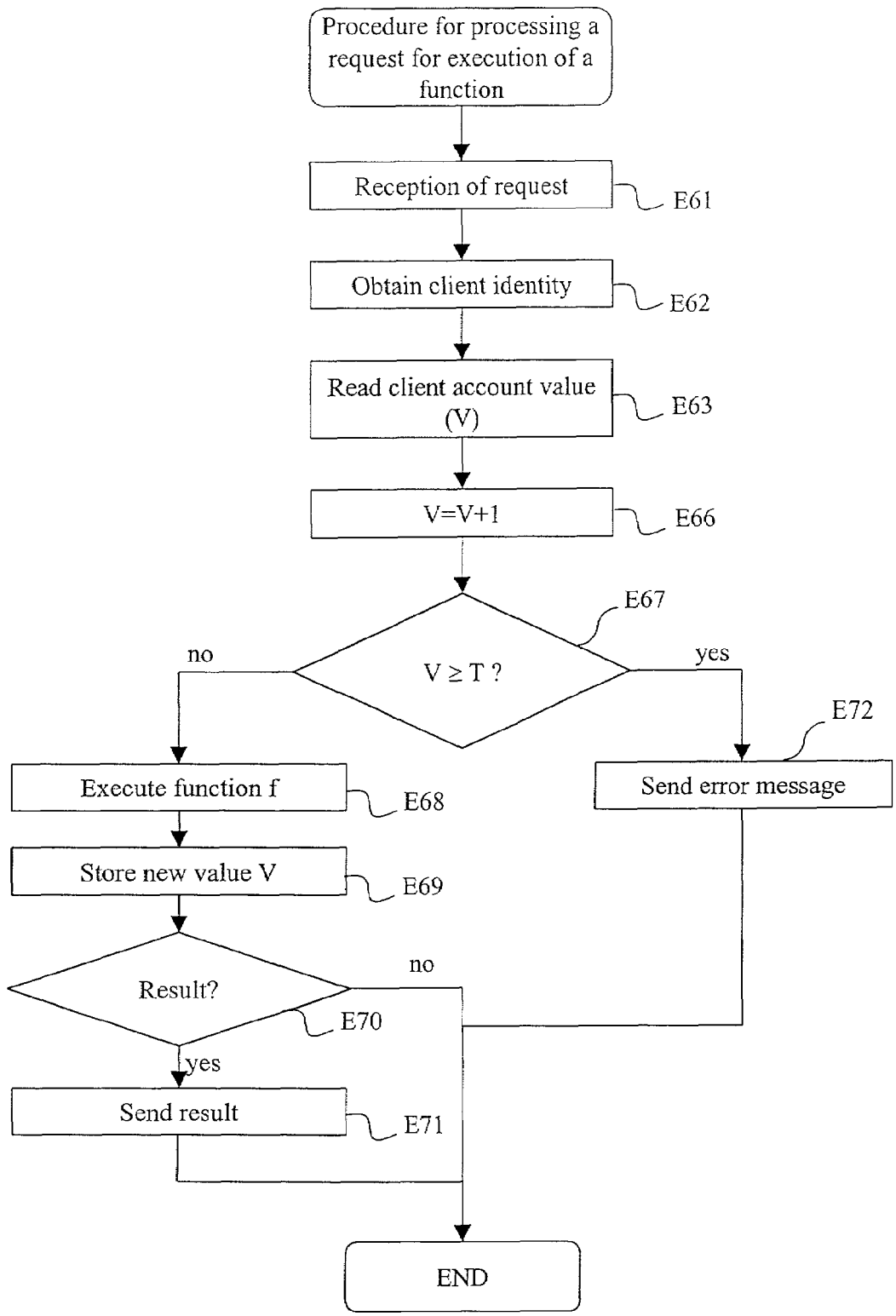
FIG. 7B is an algorithm illustrating the operation execution method according to a third embodiment.

FIG. 7B illustrates an other embodiment of the operation execution method.

In this embodiment, the value representing the activity of the client station U on the server station H is equal to the number of operations executed on this server station H in response to different execution requests sent by the client station U.

As before, the operation execution method comprises a step E61 of receiving a request for execution of a function f.

An obtaining step E62 also makes it possible to obtain the identity of the client from information incorporated in the execution request received.

A reading step E63 makes it possible to know the value representing an activity V as stored in an account associated with the client station U.

The updating step E66 then consists of increasing this value representing an activity V by one unit:

$$V=V+1$$

A comparison step E67 is then implemented as before in order to compare the value representing an activity V with a predetermined threshold value T.

Here this predetermined threshold value T corresponds to a number of invocations of functions on the server station by a client station U, a number T beyond which the subsequent functions are paid for.

By way of non-limitative example, this predetermined threshold value T can be equal to 10.

Steps E68 to E72 of this operation execution method are then identical to those described above with reference to FIG. 7A.

By virtue of this method of executing operations, it is possible to easily implement an initial phase free of charge on a server station H whose services are paid for.

The server station H can of course enable the client station to consult the state of its account and the value V at any time.

Thus operations can be executed by the server station, without being remunerated, as soon as an execution request sent by a client station is received, without requiring of this client station any additional operations other than the simple sending of a request to execute a predetermined operation.

In addition, the period during which the operations are executed free of charge on the server station is defined from a value representing the activity of each client station on the server station, this value being updated each time a new request to execute an operation on the server station is received.

The predetermined threshold value can correspond to an initial phase of free use of the services supplied by the server station, by way of advertising, for example, or to a lump sum already paid by the client station.

Such an initial free phase is perfectly well adapted to each user, whatever their frequency of use of the server station.

When the value representing an activity of a client station is the sum of the execution costs associated respectively with operations executed on the server station in response to the reception of requests to execute these operations, sent by the client station, the value representing the activity of the client station corresponds to the sum expended virtually on the server station.

Beyond a certain value, corresponding to a predetermined sum of money, the server station is remunerated by an amount equal to the cost of execution of each executed operation.

This value representing an activity, based on the costs of execution of the different operations which can be executed by the server station, is particularly well adapted when the operations supplied by the server station can have costs which are very different from each other.

When the value representing an activity of a client station is equal to the number of operations executed on the server station in response to the reception of the request to execute these operations, sent by the client station, the value representing the activity is then determined according to the number of invocations of the server station by the client station.

Figure 8:
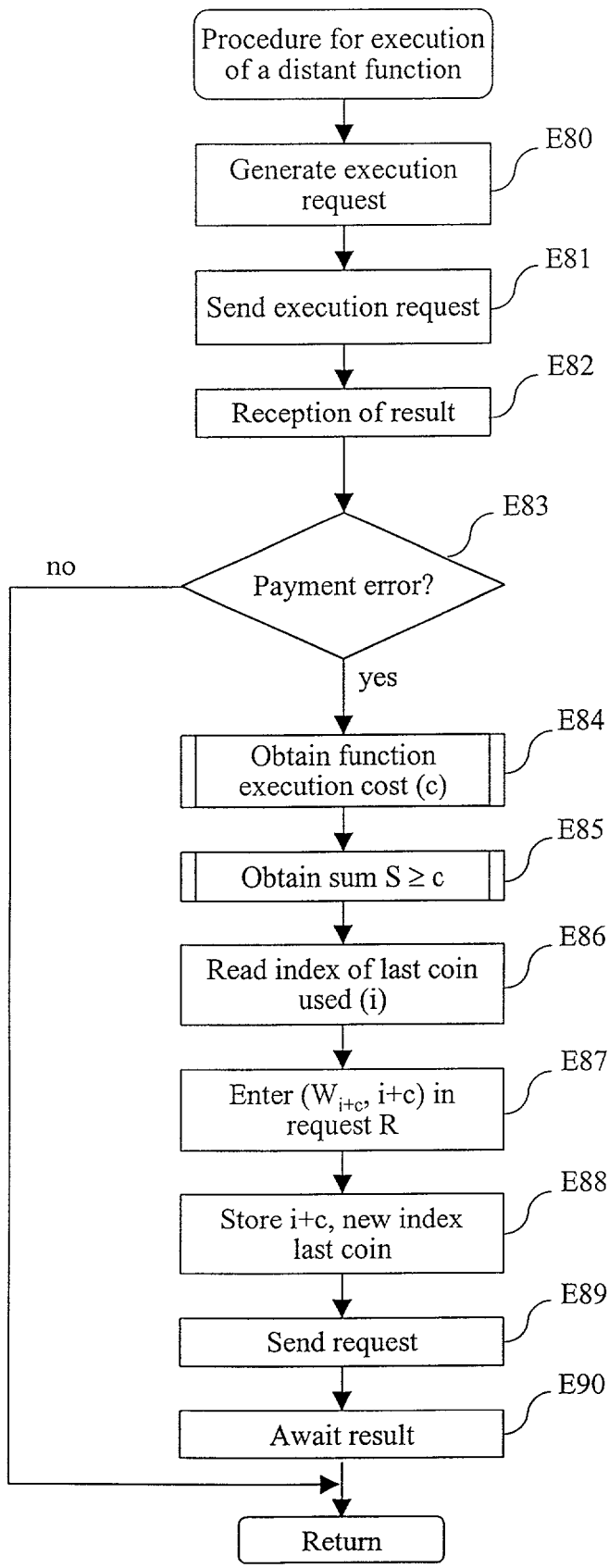
FIG. 8 is an algorithm illustrating a method for remote execution of an operation implemented on a client station according to a second embodiment of the invention.

In parallel to the implementation of these operation execution methods as described in reference to FIGS. 7A and B, the method for remote execution of a function on the client station U is slightly modified as illustrated in FIG. 8.

This method of executing a function at a distance includes first of all a step E80 of generating a remote function execution request.

As stated previously, a computer object o is written in a programming language used by the computer application peculiar to the computer which stores o and it is consequently necessary to use a communication language common to the communication network in order to share the computer objects and notably to invoke at a distance functions on these objects o.

It is possible to use a communication language such as XML ("eXtended Markup Language") with the different data fields described previously.

The request to execute at a distance a function on an object o is then sent in a sending step E81 by the client station U to the server station H.

Next a result reception step E82 makes it possible to receive the result sent by the server station H at the end of the method of executing operations as described previously with reference to FIGS. 7A and 7B.

A test E83 checks whether a request indicating that the execution of the function f is to be paid for on the server station H is received.

In the negative, the procedure of execution of the distance function f is terminated.

Otherwise, in order to obtain execution of the function f on the server station H, the client station U must send a sum of money at least equal to the cost of execution of this function f.

A step E84 makes it possible to obtain the execution cost c associated with the function f.

This execution cost c can be included directly in the request sent at the sending step E72 by the server station as described before in FIGS. 7A and 7B.

If not, a particular procedure is implemented in order to obtain this execution cost.

This procedure of obtaining the execution cost c of the function f corresponds to the steps E1 to E8 described previously with reference to the FIG. 3.

Here, the interface associated with the object o may be already transmitted by the server station H in the request sent at the sending step E72, when the predetermined threshold value T is reached.

When the cost c associated with the function f which it is wished to execute at a distance is known, a procedure E85 for obtaining a sum of money S at least greater than the cost of the function to be executed is implemented.

This procedure of obtaining a sum of money S was described previously in detail with reference to FIG. 4.

The client station U implements a reading step E86 for reading in the table of coins 14 the index of the last piece used.

For a cost c of the function f, and assuming that each coin $W_i$ corresponds to a unit fraction of the cost c, c coins are taken from the table of coins 14.

Here, and in no way limitatively, the sum of money necessary for the execution of the function is entered directly in the request for remote execution of the predetermined operation.

In practice, in the remote execution request the value $(W_{i+c}, i+c)$ is entered.

After this entering step E87, a storage step E88 stores the new index i+c corresponding to the last coin used in the table of coins 14 for the server H.

Thus the remote execution request transmitted by the client station U during the sending step E89 contains the sum of money necessary for the execution of the function requested on the server station H.

The function can thus be executed and paid for as required. The execution of the function on the server station H was described with reference to FIGS. 5 and 6.

Naturally many modifications can be made to the example embodiment described above without departing from the scope of the invention.

In particular, the PayWord system is only one example amongst others of electronic money which can be generated on the client station U and then spent on the server station H in a communication network.

In addition, the improved XML language used here can be replaced by other known systems such as CORBA, DCOM or JAVA/RMI.

Moreover, after the free initial phase of the method of executing operations on the server station H, the operations performed by the client station can be invoiced with a traditional macropayment protocol.

In the latter case, the server station opens a client account and invoices the operations performed by the client at the end of a predetermined time, for example every month.

In addition, although the example embodiments describe a value representing an activity V which is incremented by one unit or the value of the execution cost c of a function each time a function is invoked by the client station on the server station H, the operation execution method could also be implemented conversely by subtracting, from a predetermined initial value, the cost of execution of each function or one unit for each invocation of a function.

The balance of the account can then be compared with the value 0 below which the execution of the operations on the server station is to be paid for.

Finally, the method of remote execution of functions described here can be applied to computer systems other than a distributed object-oriented system.

The invention claimed is:

1. A method for executing a remote function on a server station from a client station, comprising the steps of:
   the client station receiving, from the server station, an interface including a description of a function and an expression for calculating a cost for executing the function on the server station;

evaluating, on the client station, the cost for executing the function by calculating the received expression;

the client station generating a request for executing the function;

entering to said executing request, a specific field containing a sum of money necessary for executing the function without having to open an account on said server station for said client station; and sending, to the server station, said executing request with the specific field entered by the entering step for executing the function.

2. A method according to claim 1, wherein said receiving step receives a function associated with the cost for executing the function, wherein the cost for executing the function is evaluated from the received expression.

3. A method according to claim 1, wherein said receiving step comprises a step of sending to the server station a request to execute the function, and said receiving step receives from the server station a request indicating that the execution of the function is to be paid and the expression for calculating the cost for executing the function.

4. A method according to claim 1, wherein the expression for calculating the cost for executing the function is related to at least one parameter of an object on which the function could be executed.

5. A method according to claim 4, wherein the expression for calculating the cost for executing the function is further related to at least one parameter of the function.

6. A method according to claim 1, wherein the evaluating step is performed according to at least one parameter of an object on which the request for executing the function is sent.

7. A method according to claim 6, wherein the evaluating is performed according to at least one parameter of the function requested in the executing request.

8. A method according to claim 1, wherein the received interface is in a markup language including the description of the function.

9. A client station for executing a remote function on a server station, comprising:

receiving means for receiving, from a server station, an interface including a description of a function and an expression for calculating a cost for executing the function on the server station;

evaluating means for evaluating the cost for executing the function by calculating the received expression;

generating means for generating a request for executing the function;

entering means for entering, in said executing request, a specific field containing a sum of money necessary for executing the function without having to open an account on said server station for said client station; and sending means for sending, to the server station, said executing request with the specific field entered by the entering means.

10. A client station according to claim 9, wherein said receiving means receives a function associated with the cost for executing the function, wherein the cost for executing the function is evaluated from the received expression.

11. A client station according to claim 9, wherein said receiving means comprises means for sending to the server station a request to execute the function, and said receiving means receives from the server station a request indicating that the execution of the function is to be paid and the expression for calculating the cost for executing the function.

12. A client station according to claim 9, wherein the expression for calculating the cost for executing the function is related to at least one parameter of an object on which the function could be executed.

13. A client station according to claim 12, wherein the expression for calculating the cost for executing the function is further related to at least one parameter of the function.

14. A client station according to claim 9, wherein evaluating means evaluates the cost for executing the function according to at least one parameter of an object on which the request for executing the function is sent.

15. A client station according to claim 14, wherein said evaluating means evaluates the cost for executing the function according to at least one parameter of the function requested in the executing request.

16. A client station according to claim 9, wherein the received interface is in a markup language including the description of the function.

17. A computer-readable program stored on a computer-readable memory medium, the program for executing a remote function on a server station from a client station, the program comprising the steps of:

the client station receiving, from the server station, an interface including a description of a function and an expression for calculating a cost for executing the function on the server station;

evaluating, on the client station, the cost for executing the function by calculating the received expression;

the client station generating a request for executing the function;

entering to said executing request, a specific field containing a sum of money necessary for executing the function without having to open an account on said server station for said client station; and sending, to the server station, said executing request with the specific field entered by the entering step for executing the function.

* * * * *